United States Patent
Murayama et al.

(10) Patent No.: US 9,112,421 B2
(45) Date of Patent: Aug. 18, 2015

(54) CONVERTER CIRCUIT INCLUDING SWITCH ELEMENT UNIT

(75) Inventors: Kei Murayama, Osaka (JP); Satoru Inakagata, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 159 days.

(21) Appl. No.: 13/814,587

(22) PCT Filed: Sep. 9, 2011

(86) PCT No.: PCT/IB2011/002101
§ 371 (c)(1),
(2), (4) Date: Feb. 6, 2013

(87) PCT Pub. No.: WO2012/035396
PCT Pub. Date: Mar. 22, 2012

(65) Prior Publication Data
US 2013/0135904 A1    May 30, 2013

(30) Foreign Application Priority Data
Sep. 15, 2010  (JP) .................................. 2010-207257

(51) Int. Cl.
*H02M 3/335* (2006.01)
*H02M 3/337* (2006.01)

(52) U.S. Cl.
CPC ........ *H02M 3/33569* (2013.01); *H02M 3/3376* (2013.01); *H02M 3/33561* (2013.01)

(58) Field of Classification Search
CPC ... H02M 3/38; H02M 3/335; H02M 3/33561; H02M 3/33569; H02M 3/3376
USPC ........ 363/15–17, 21.01, 21.02, 21.12, 65, 71, 363/72; 323/906; 257/192
See application file for complete search history.

(56) References Cited

U.S. PATENT DOCUMENTS

| | | | |
|---|---|---|---|
| 5,625,539 A * | 4/1997 | Nakata et al. | 363/17 |
| 6,538,909 B2 * | 3/2003 | Goodarzi et al. | 363/98 |
| 6,979,916 B2 * | 12/2005 | Schienbein et al. | 307/82 |
| 8,076,699 B2 * | 12/2011 | Chen et al. | 257/194 |
| 8,159,848 B2 * | 4/2012 | Morimoto et al. | 363/127 |
| 2007/0230222 A1 * | 10/2007 | Drabing et al. | 363/21.01 |

(Continued)

FOREIGN PATENT DOCUMENTS

| CN | 101523614 | 9/2009 |
|---|---|---|
| JP | H09-098544 | 4/1997 |

(Continued)

OTHER PUBLICATIONS

International Search Report for corresponding International Application No. PCT/IB2011/002101 mailed Dec. 27, 2011.

(Continued)

*Primary Examiner* — Gary L Laxton
*Assistant Examiner* — Kyle J Moody
(74) *Attorney, Agent, or Firm* — Renner, Otto, Boisselle & Sklar, LLP (57) ABSTRACT

A converter circuit includes a transformer having primary windings and at least one secondary winding, a rectifier circuit connected to the secondary winding, and oscillating circuits connected to the primary windings. Each of the oscillating circuits has a switch element unit having no body diode.

9 Claims, 12 Drawing Sheets

(56) References Cited

U.S. PATENT DOCUMENTS

| | | | |
|---|---|---|---|
| 2008/0192510 A1* | 8/2008 | Falk | 363/17 |
| 2010/0008107 A1* | 1/2010 | Mallwitz et al. | 363/21.02 |
| 2010/0097105 A1 | 4/2010 | Morita et al. | |
| 2010/0135053 A1* | 6/2010 | Morimoto et al. | 363/127 |
| 2011/0037319 A1* | 2/2011 | Matsui et al. | 307/43 |
| 2011/0273136 A1 | 11/2011 | Yoshimoto | |
| 2012/0074920 A1* | 3/2012 | Callanan | 323/311 |
| 2013/0128624 A1* | 5/2013 | Tamura et al. | 363/21.01 |
| 2013/0170252 A1* | 7/2013 | Nishino et al. | 363/21.02 |
| 2013/0194830 A1* | 8/2013 | Nishino et al. | 363/20 |

FOREIGN PATENT DOCUMENTS

| | | |
|---|---|---|
| JP | H11-215818 | 8/1999 |
| JP | 2000-172350 | 6/2000 |
| JP | 2001-258255 | 9/2001 |
| JP | 2005-229729 | 8/2005 |
| JP | 2005-287230 | 10/2005 |
| JP | 2005-309203 | 11/2005 |
| JP | 2010-119169 | 5/2010 |
| JP | 2010-166692 | 7/2010 |

OTHER PUBLICATIONS

Form PCT/ISA/237 for corresponding International Application No. PCT/IB2011/002101 dated Dec. 27, 2011.

Y.-M. Chen et al, "Multi-Input DC/DC Converter Based on the Flux Additivity", Industry Applications Conference, 2001. Thirty-Sixth IAS Annual Meeting. Conference Record of the 2001 IEEE, pp. 1866-1873 vol. 3.

Chinese Office Action issued on Oct. 11, 2014 in a corresponding Chinese application No. 201180039261.9, the Search Report, and the English translation of the Search Report thereof.

* cited by examiner

CONVERTER CIRCUIT INCLUDING SWITCH ELEMENT UNIT

FIELD OF THE INVENTION

The present invention relates to a converter circuit (DC/DC converter) for a hybrid power source including, e.g., a solar cell, a secondary battery as a backup power source of the solar cell and the like.

BACKGROUND OF THE INVENTION

In a photovoltaic system, an electric power generated by a solar cell is influenced by weather conditions and the like, and a voltage is changed by a temperature variation in the solar cell itself and the like. Therefore, a secondary battery is used as a backup power source, and when the amount of the electric power generated by the solar cell is small, the electric power is discharged from the secondary battery to stabilize the electric power supplied to a load. The voltage of the secondary battery is set to be slightly lower than the voltage at which the electric power generation of the solar cell is stable and is charged from the solar cell when the electric power consumed by the load is small.

In a hybrid power source including a solar cell, a secondary battery for backup of the solar cell and the like, since the voltage of the solar cell is different from the rated voltage of the load and the secondary battery, the voltage is stepped up/down by using a DC/DC converter to supply an electric power to the load. In the general circuit configuration, a DC/DC converter is provided for each of the solar cell and the secondary battery.

Therefore, in designing the DC/DC converter, it is important to achieve both the miniaturization and high efficiency of the DC/DC converter, and it has been proposed that a plurality of DC power sources share a transformer and a rectifier circuit (see, e.g., JP 2005-2297, herein after Patent Document 1).

Figure 12:
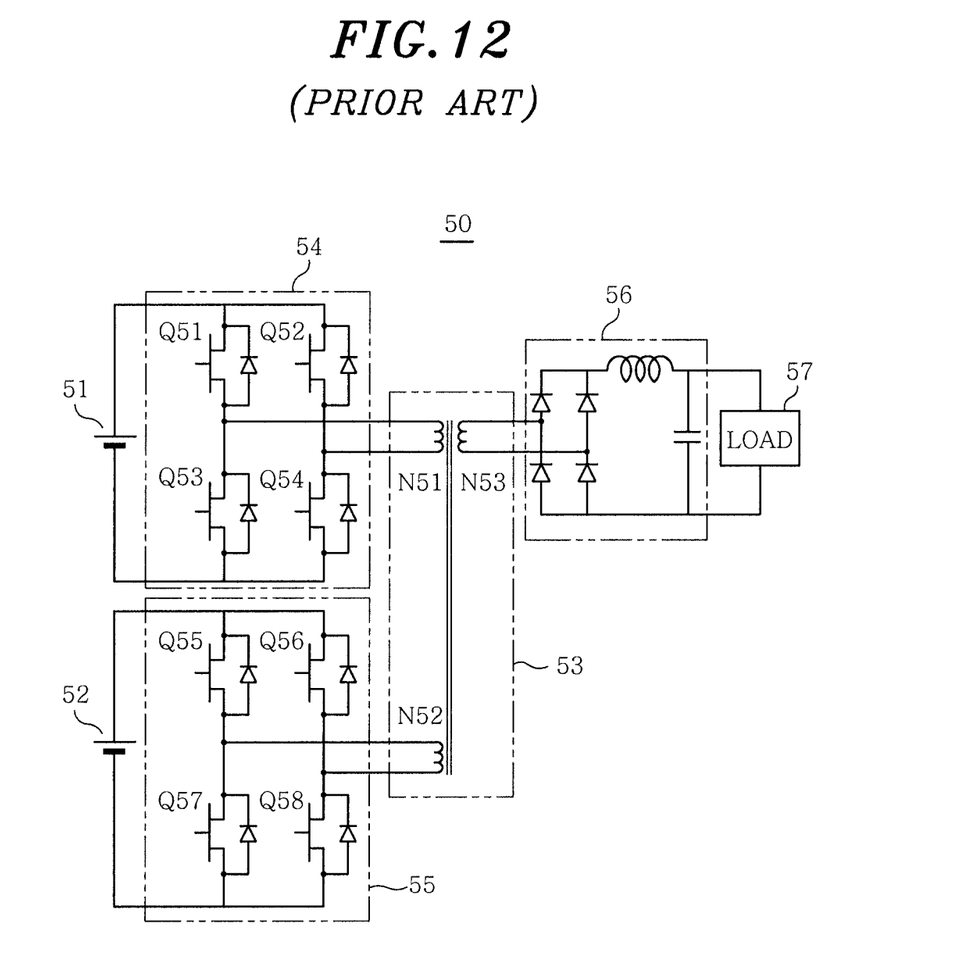
FIG. 12 shows a circuit configuration of a conventional DC/DC converter using a MOSFET as a switch element.

Patent Document 1 does not disclose a specific circuit configuration of the DC/DC converter, but FIG. 12 shows a circuit configuration of a DC/DC converter 50 using a general MOSFET as a switch element. A first and a second primary winding N51 and N52 corresponding to a first and a second DC power source 51 and 52, respectively, are provided on a primary side of a transformer 53, and one secondary winding N53 corresponding to the load 57 is provided on the secondary side of the transformer 53. A first oscillation circuit 54 having a full-bridge structure, which is formed of four switch elements Q51 to Q54, is connected to the first primary winding N51. Further, a second oscillation circuit 55 having a full-bridge structure, which is formed of four switch elements Q55 to Q58, is connected to the second primary winding N52. A rectifier circuit 56 is connected to the secondary winding N53.

The first DC power source 51 is a solar cell and the second DC power source 52 is a secondary battery. The voltage of the solar cell is VDC1, and a reference voltage of the solar cell is Vref1. The voltage of the secondary battery is VDC2, and a reference voltage of the secondary battery is Vref2. The number of turns of the first primary winding N51 and the number of turns of the second primary winding N52 are n1 and n2, respectively.

In order that the output voltage of the load by the discharge operation from the secondary battery and the power generation of the solar cell is kept constant, it is preferable to set a turns ratio n2/n1 of the primary windings N51 and N52 to satisfy Vref1×n2/n1=Vref2.

However, considering that the secondary battery is charged from the solar cell, it is preferable to set a turns ratio n2/n1 of the primary windings N51 and N52 to satisfy Vref1×n2/n1>Vref2.

In practice, since the voltage applied to the load 57 is not constant and has a tolerance value, it is set to satisfy Vref1×n2/n1>Vref2. However, in order to more easily describe the nature of the problem in the present invention, the problem will be described below on the assumption that a turns ratio satisfies Vref1×n2/n1=Vref2.

Figure 13:
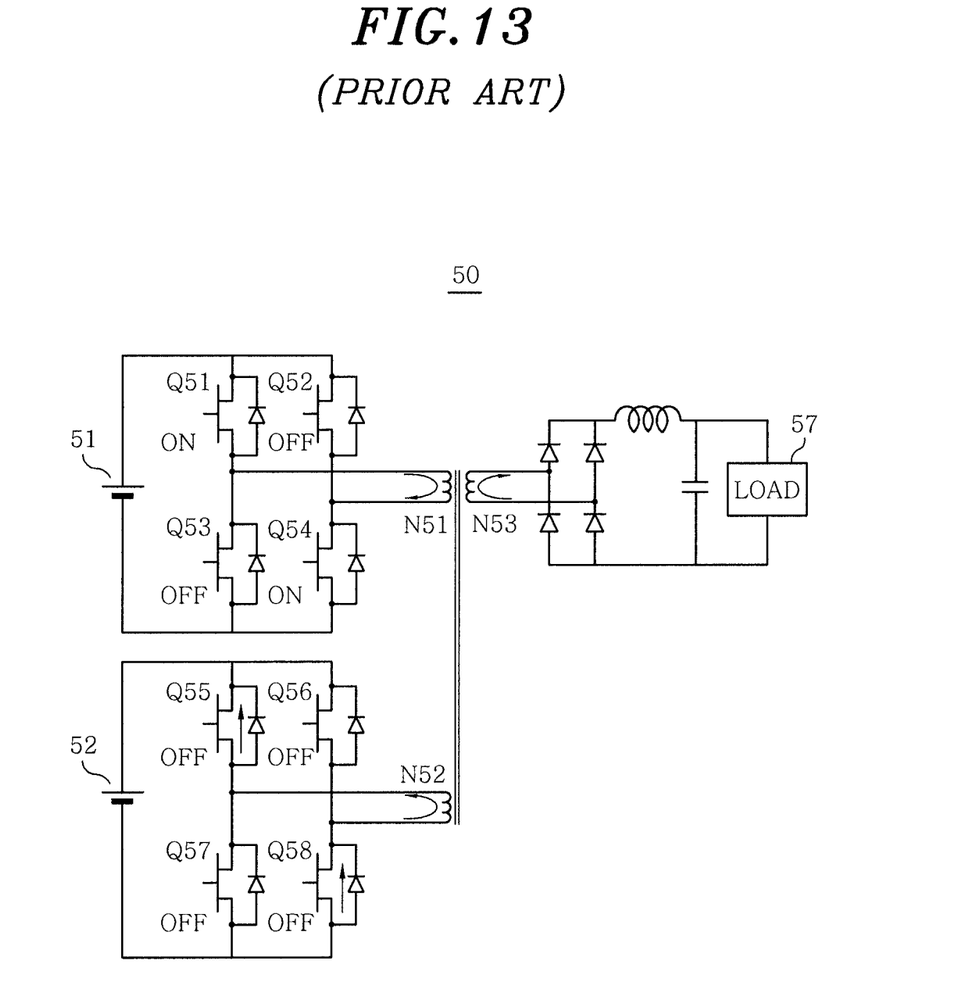
FIG. 13 shows a state where the electric power is supplied to the load from the first DC power source in the conventional DC/DC converter.

FIG. 13 shows a state where in the case of VDC1×n2/n1>VDC2, for example, under the condition that the voltage of the solar cell is varied to be larger than the reference voltage Vref1 and the voltage of the secondary battery is the reference voltage Vref2 (VDC1>Vref1, VDC2=Vref2), the switch elements Q55 to Q58 are turned off while the switch elements Q51 and Q54 and the switch elements Q52 and Q53 are alternately turned on and off, so that the electric power is supplied to the load 57 from the first DC power source 51. In FIG. 13, the switch elements Q51 and Q54 are being turned on. When supplying the electric power to the load 57 from both the first and the second DC power source 51 and 52, the switch elements Q51 and Q54, the switch elements Q52 and Q53, the switch elements Q55 and Q58, and the switch elements Q56 and Q57 may be sequentially turned on by time division.

Under the conditions of VDC1>Vref1 and VDC2=Vref2, the voltage VN52 of the primary winding N52 satisfies VN52=VDC1×n2/n1=VDC1×Vref2/Vref1>VDC2 by the induced electromotive force generated in the primary winding N52 from the primary winding N51. Thus, the voltage of the primary winding N52 becomes larger than VDC2. Since MOSFET has a body diode (parasitic diode), a reverse current flows through the second DC power source 52 by the electromotive force generated in the second primary winding N52 via the body diodes of the switch elements Q55 and Q58. The same is true when the switch elements Q52 and Q53 are turned on. Since such a reverse current becomes a charging current to the secondary battery, substantially, the first DC power source 51 charges the secondary battery while supplying the electric power to the load 57, thereby resulting in an increase in the current flowing through the first oscillation circuit 54 on the side of the first DC power source 51.

Accordingly, the loss due to the switch elements Q51 to Q54 included in the first oscillation circuit 54 is increased, and the power supply efficiency of the first DC power source 51 is decreased. Further, the secondary battery is charged through the body diodes of the switch elements Q55 to Q58, and there occurs a problem such that it cannot be charged at certain timings (even if charging is not desired, it is charged arbitrarily).

Similarly, under the condition of VDC1×n2/n1<VDC2, when the electric power is outputted from the second DC power source 52, a reverse current flows through the first DC power source 51. That is, in the configuration of FIG. 13, the voltage of the first and the second DC power source 51 and 52 varies, and there occurs a problem such that the efficiency is deteriorated in the case of VDC1×n2/n1≠VDC2.

Figure 14:
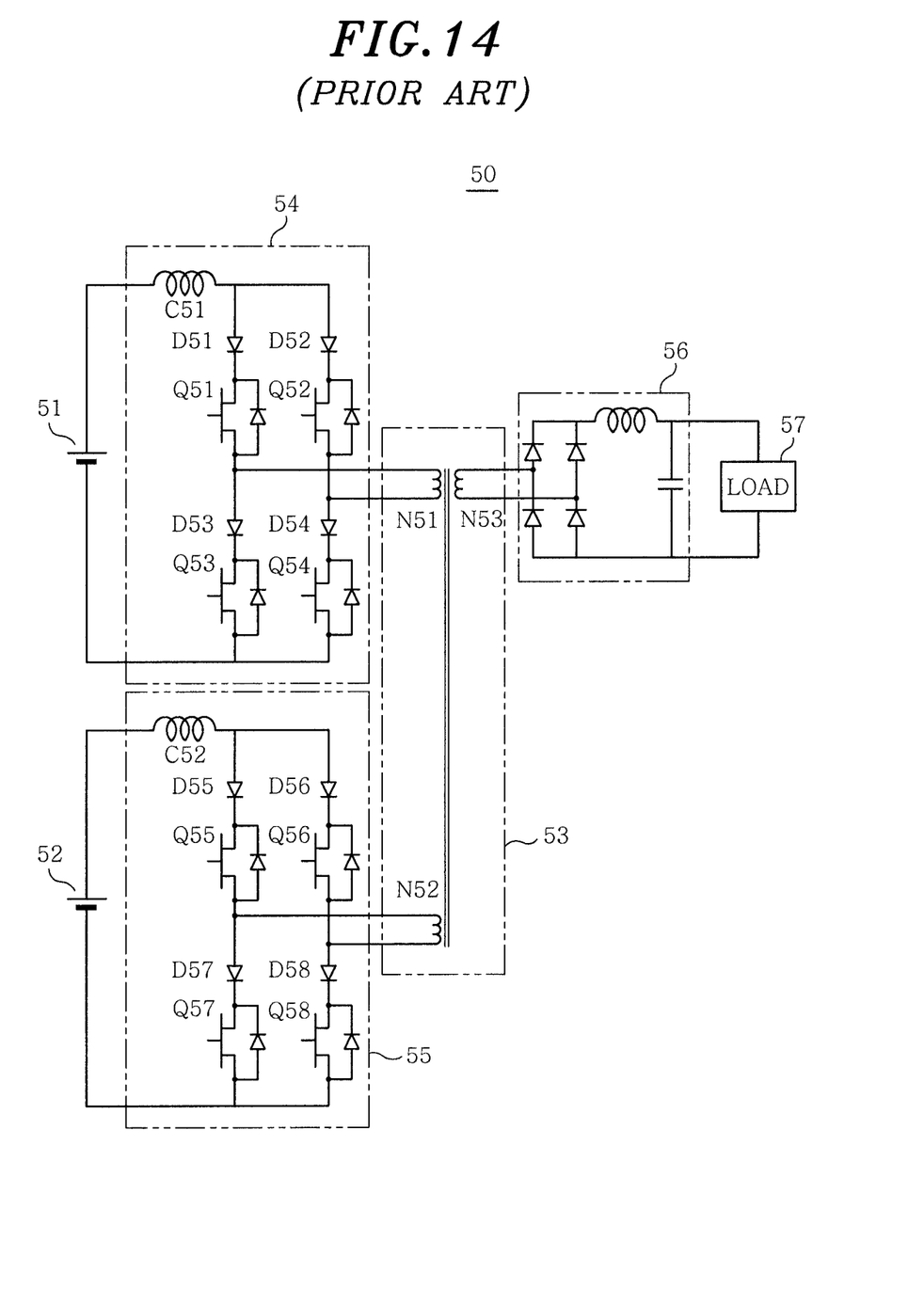
FIG. 14 shows a circuit configuration of the conventional DC/DC converter in which a backflow prevention diode is connected to the MOSFET.

In another conventional example shown in FIG. 14, in order to prevent the reverse current from flowing through the first DC power source 51 or the second DC power source 52, backflow prevention diodes D51 to D58 are connected in series to the switch elements Q51 to Q58, respectively, in opposite directions to the body diodes (see Chen et al. "Multi-Input DC/DC Converter Based on the Flux Additivity," herein after Non-patent Document 1).

However, when a current flows in the forward direction through the backflow prevention diodes, the loss due to the diodes is increased and the power supply efficiency from the first DC power source 51 or the second DC power source 52 is decreased. Further, it is necessary to add the backflow prevention diodes D51 to D58 or choke coils C51 and C52 to the oscillation circuits 54 and 55, which results in reducing an advantage of the miniaturization of the DC/DC converter 50 obtained by sharing the transformer 53 and the rectifier circuit 56. In addition, since the reverse current does not flow through the second DC power source 52 by the backflow prevention diodes, the secondary battery cannot be charged by using this DC/DC converter.

SUMMARY OF THE INVENTION

The present invention provides a converter circuit for a hybrid power source in which a transformer and a rectifier circuit are commonly used, capable of preventing a reverse current from flowing through one DC power source when supplying an electric power to a load from the other DC power source and reducing a loss without reducing a power supply efficiency. Further, if necessary, it is possible to charge the secondary battery via a DC/DC converter.

In accordance with an embodiment of the present invention, there is provided a converter circuit including: a transformer having primary windings and at least one secondary winding; a rectifier circuit connected to the secondary winding; and oscillation circuits connected to the primary windings. Each of the oscillation circuits includes a switch element unit having no body diode.

In accordance with another embodiment of the present invention, there is provided a converter circuit including: a transformer having a first primary winding, a second primary winding and a secondary winding; a rectifier circuit connected between the secondary winding and a load; a first oscillation circuit connected to a first DC power source and the first primary winding; a second oscillation circuit connected to a second DC power source and the second primary winding; and a control circuit configured to control the first and the second oscillation circuit. Each of the first and the second oscillation circuit includes a switch element unit having no body diode.

Further, the switch element unit having no body diode may have a lateral transistor structure using a GaN/AlGaN structure.

Further, the switch element unit having no body diode may be a bidirectional switch element.

Further, the switch element unit of each of the first and the second oscillation circuit may include two pairs of switch elements forming a full-bridge circuit.

Further, the switch element unit of each of the first and the second oscillation circuit may include a pair of switch elements forming a half-bridge circuit.

Further, the switch element unit of each of the first and the second oscillation circuit may include one switch element.

Further, the transformer may be a flyback transformer.

Further, the number of turns may be variable in at least one of the first and the second primary winding.

In accordance with the present invention, since the switch element unit having no body diode is used as a switch element constituting the oscillation circuit, a reverse current does not flow through the oscillation circuit when the switch element is not turned on. Therefore, when supplying the electric power to the load from one DC power source, if the switch element of the oscillation circuit connected to the other DC power source is turned off, a reverse current does not flow through the other DC power source, and the power supply efficiency is not reduced. Further, there occurs no loss due to the body diode. Further, if necessary, when one DC power source is a secondary battery and the voltage of the other DC power source is higher than the voltage of the secondary battery, it is possible to charge the secondary battery through the DC/DC converter.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, an embodiment of the present invention will be described in detail with reference to the accompanying drawings which form a part hereof. Throughout the specification and drawings, like reference numerals will be given to like parts having substantially the same function and configuration, and a redundant description thereof will be omitted.

Figure 1:
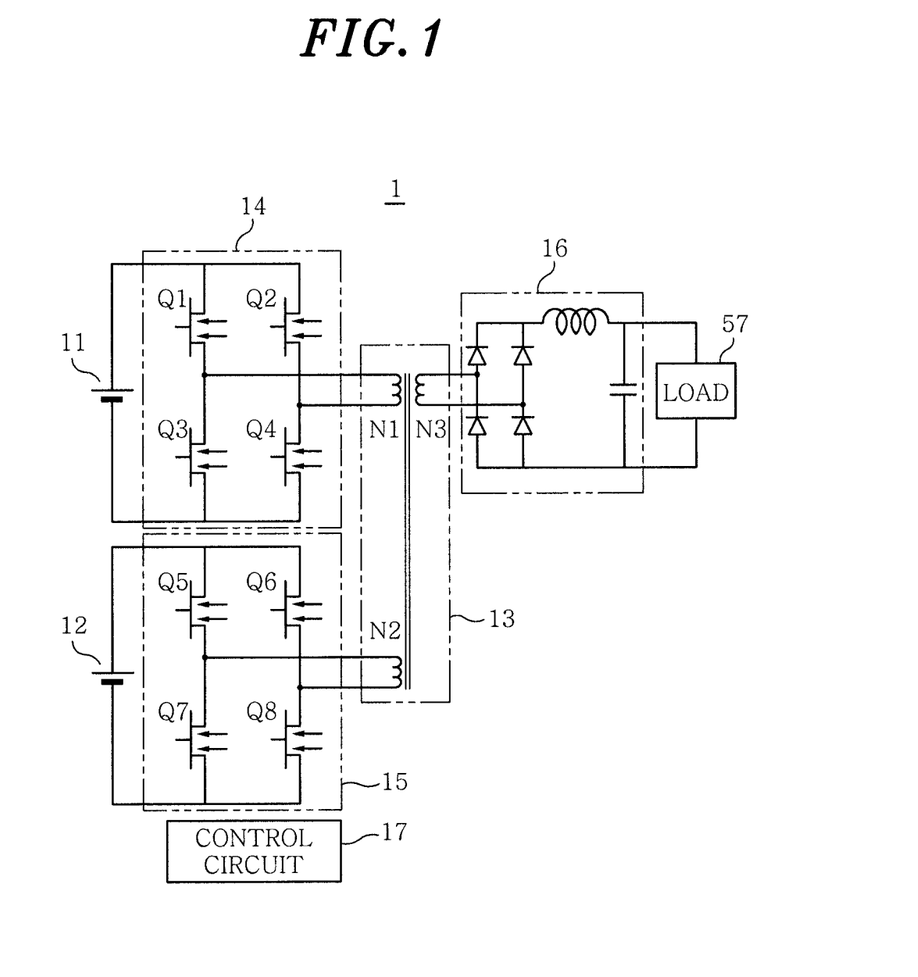
FIG. 1 is a circuit diagram showing a circuit configuration of a DC/DC converter in accordance with an embodiment of the present invention.

A converter circuit (DC/DC converter) in accordance with an embodiment of the present invention will be described. FIG. 1 is a circuit diagram showing a circuit configuration of a DC/DC converter 1. In order to simplify the explanation, a case with two power sources of a first DC power source 11 and a second DC power source 12 will be described, but the number of power sources is not limited to two.

The DC/DC converter 1 is a DC/DC converter for a hybrid power source for supplying an electric power supplied from a plurality of DC power sources including the first and the second DC power source 11 and 12 to a load 57. The DC/DC converter 1 functions as a DC/DC converter for supplying an electric power to the load 57 from the first DC power source 11, and also functions as a DC/DC converter for supplying an electric power to the load 57 from the second DC power source 12. The DC/DC converter 1 may be regarded as two DC/DC converters which share a transformer 13, a rectifier circuit 16 and a control circuit 17.

A first primary winding N1 and a second primary winding N2 are provided at the primary side of the transformer 13, and one secondary winding N3 is provided at the secondary side of the transformer 13. A first oscillation circuit 14 is connected to the first primary winding N1, and the first DC power source 11 is connected to the first oscillation circuit 14. Similarly, a second oscillation circuit 15 is connected to the second primary winding N2, and the second DC power source 12 is connected to the second oscillation circuit 15. A rectifier circuit 16 is connected to the secondary winding N3, and the load 57 is connected to the rectifier circuit 16. The first oscillation circuit 14 and the second oscillation circuit 15 have basically the same configuration. The first oscillation circuit 14 includes a full bridge circuit formed of four bidirectional switch elements Q1 to Q4. Similarly, the second oscillation circuit 15 includes a full bridge circuit formed of four bidirectional switch elements Q5 to Q8.

In FIG. 1, a wiring connecting the gate of each of the bidirectional switch elements Q1 to Q8 to the control circuit 17 is omitted. Further, in this embodiment, one secondary winding N3 is merely provided at the secondary side of the transformer 13, but two or more secondary windings may be provided without being limited thereto.

Figure 3A:
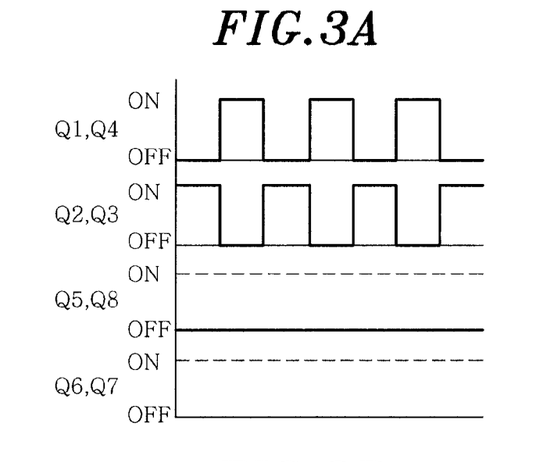
FIGS. 3A to 3C are time charts each showing waveforms of the gate signals of the bidirectional switches elements for driving the DC/DC converter.

For example, it is assumed that the first DC power source 11 is a solar cell and the second DC power source 12 is a secondary battery. When supplying an electric power to the load 57 from the first DC power source 11 alone, as shown in FIG. 3A, the control circuit 17 alternately turns on and off a pair of the bidirectional switch elements Q1 and Q4 and a pair of the bidirectional switch elements Q2 and Q3 of the first oscillation circuit 14. In the meantime, the control circuit 17 turns off all of the bidirectional switch elements Q5 to Q8 of the second oscillation circuit 15.

Figure 3B:
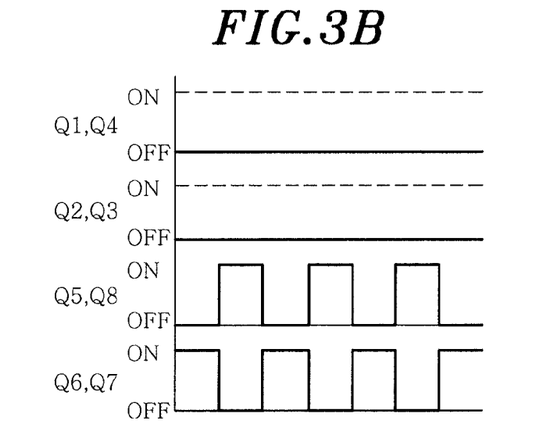

On the other hand, when supplying an electric power to the load 57 from the second DC power source 12 alone, as shown in FIG. 3B, the control circuit 17 alternately turns on and off a pair of the bidirectional switch elements Q5 and Q8 and a pair of the bidirectional switch elements Q6 and Q7 of the second oscillation circuit 15. In the meantime, the control circuit 17 turns off all of the bidirectional switch elements Q1 to Q4 of the first oscillation circuit 14.

Figure 3C:
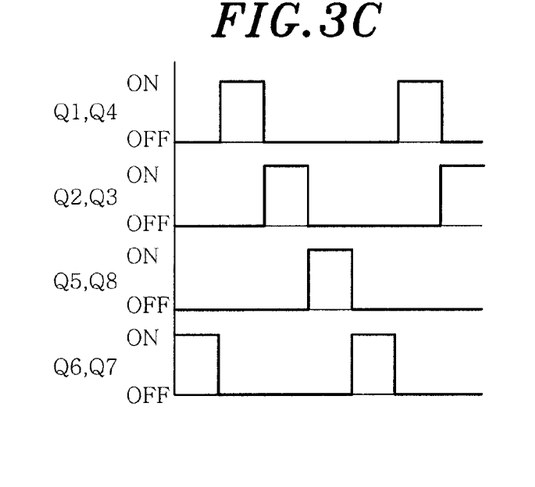

Further, when an electric power is alternately supplied from the first and the second DC power source 11 and 12 to the load 57, as shown in FIG. 3C, a pair of the bidirectional switch elements Q1 and Q4, a pair of the bidirectional switch elements Q2 and Q3, a pair of the bidirectional switch elements Q5 and Q8, and a pair of the bidirectional switch elements Q6 and Q7 are sequentially turned on and off.

In this case, assuming $VDC1 \times n2/n1 > VDC2$, where a voltage of the solar cell is $VDC1$, a voltage of the secondary battery is $VDC2$, and the number of turns of the first primary winding N1 and the number of turns of the second primary winding N2 are n1 and n2, respectively.

In a conventional example shown in FIGS. 12 and 13, even if the bidirectional switch elements Q55 to Q58 of a second oscillation circuit 55 are turned off, an electromotive force is generated in the second primary winding N52, and a current flows in a body diode (parasitic diode) of each of the switch elements. Accordingly, a reverse current flows in the second DC power source 52 via the switch elements Q55 to Q58.

In contrast, as will be described below, since each of the bidirectional switch elements Q1 to Q8 has no body diode, a reverse current does not flow therethrough. That is, in accordance with the configuration of the DC/DC converter 1 of this embodiment shown in FIG. 1, even in the case of $VDC1 \times n2/n1 > VDC2$, a reverse current does not flow in the second DC power source 12. The first DC power source 11 does not charge the secondary battery while supplying an electric power to the load 57, and the current, which flows through the first oscillation circuit 14 on the side of the first DC power source 11, is not increased. In addition, the bidirectional switch elements Q1 to Q8 have a much lower loss compared with the MOSFET since they have no body diode. Accordingly, there is less loss due to the bidirectional switch elements Q1 to Q4, and the power supply efficiency of the first DC power source 11 is improved as compared with the conventional example described above.

When charging the secondary battery, the control circuit 17 turns on/off the bidirectional switch elements Q5 to Q8 of the second oscillation circuit 15 in synchronization with the on/off of the bidirectional switch elements Q1 to Q4 of the first oscillation circuit 14. Since the loss due to the bidirectional switch elements Q5 to Q8 is small, it is possible to flow a larger current as a charging current. Thus, the charging efficiency becomes higher than that in the conventional example.

Further, when an electric power is outputted from the second DC power source 12, the reverse current does not flow in the first DC power source 11 in the similar manner described above. Therefore, the power supply efficiency when supplying an electric power from the second DC power source 12 is also improved as compared with the conventional example described above.

Figure 2:
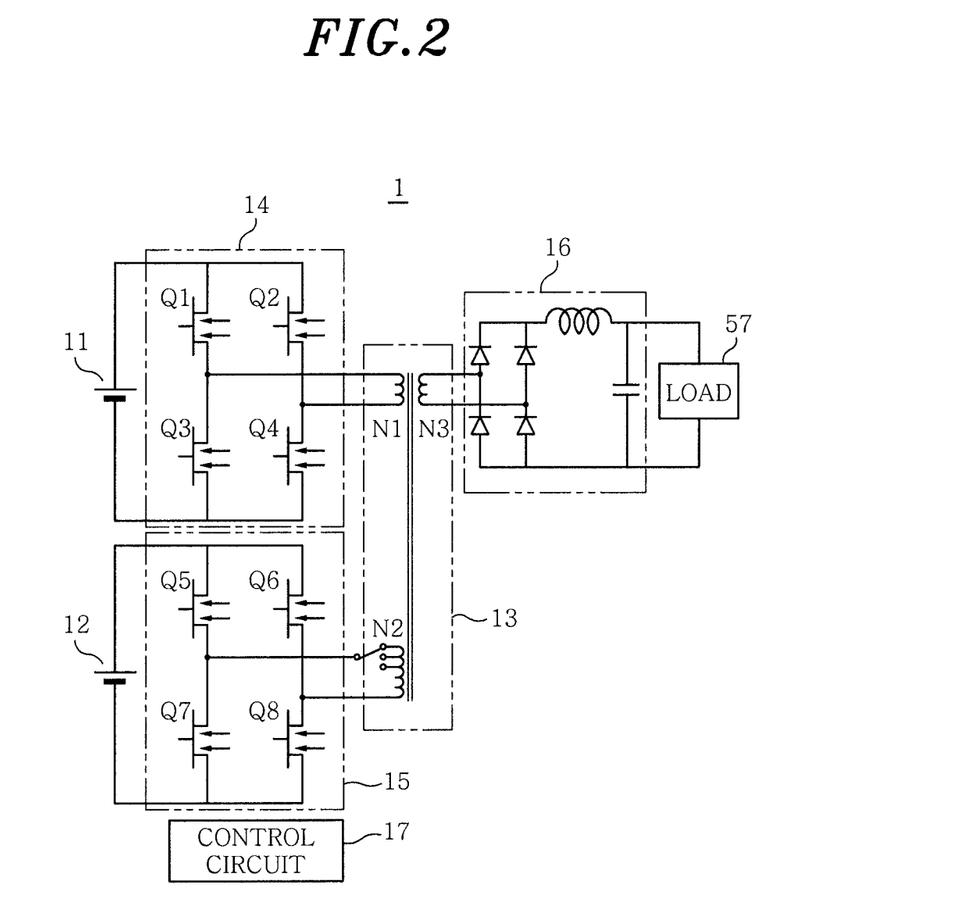
FIG. 2 shows a modification example of the DC/DC converter in accordance with the embodiment of the present invention.

FIG. 2 shows a modification example of the DC/DC converter 1. In this modification example, the number of turns of the second primary winding N2 of the transformer 13 is varied. In FIG. 2, although a changeover switch for changing the number of turns is not illustrated in detail, it is possible to configure a non-contact switch with low loss by using the bidirectional switch element as described above.

As shown in FIG. 3C, if the electric power is outputted alternately to the load 57 from the first and the second DC power source 11 and 12, it is preferable to output the voltage of the second DC power source 12 after the voltage of the second DC power source 12 is stepped up to the same level as that of the first DC power source 11.

On the other hand, when charging the second DC power source 12 serving as the secondary battery, the voltage of the electromotive force generated in the second primary winding N2 needs to be higher than the voltage of the second DC power source 12. Therefore, the second primary winding N2 has at least two types of the number of turns corresponding to a turns ratio n2/n1 satisfying $Vref1 \times n2/n1 = Vref2$ and a turns ratio n2/n1 satisfying $Vref1 \times n2/n1 > Vref2$ (n1 is constant). Further, the second primary winding N2 may have another type of the number of turns depending on the voltage variation of the first DC power source 11. In this case, in order to satisfy the setting condition of the turns ratio, n2 may be constant while n1 may be varied. Alternatively, both of n1 and n2 may be varied.

Figure 4:
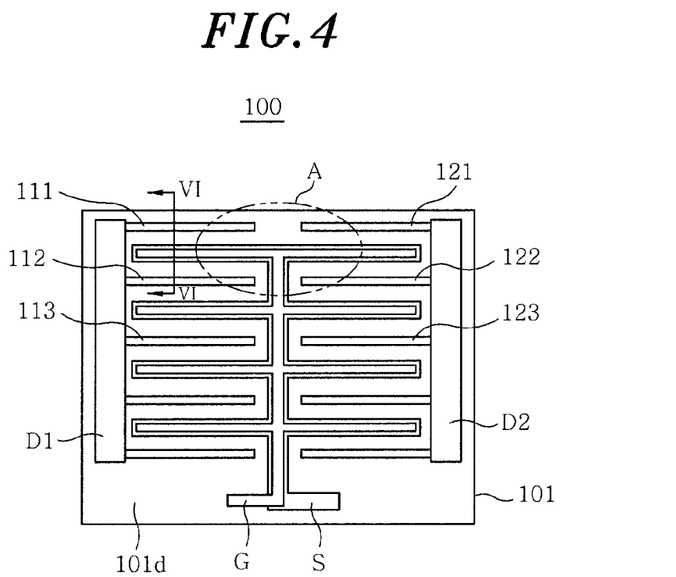
FIG. 4 is a plan view showing a configuration of the bidirectional switch element (single gate)
Figure 5:
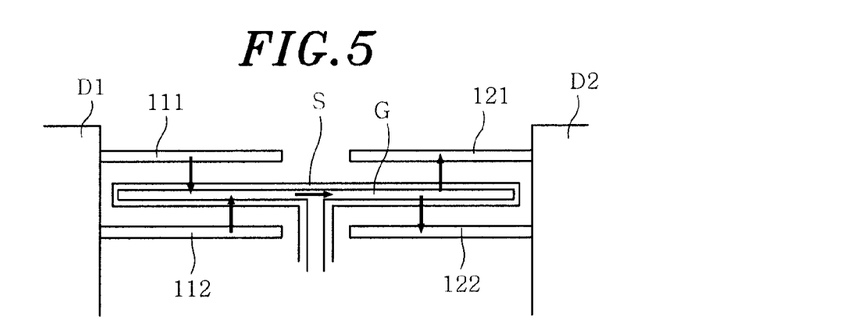
FIG. 5 is an enlarged view of area A shown in FIG. 4.
Figure 6:
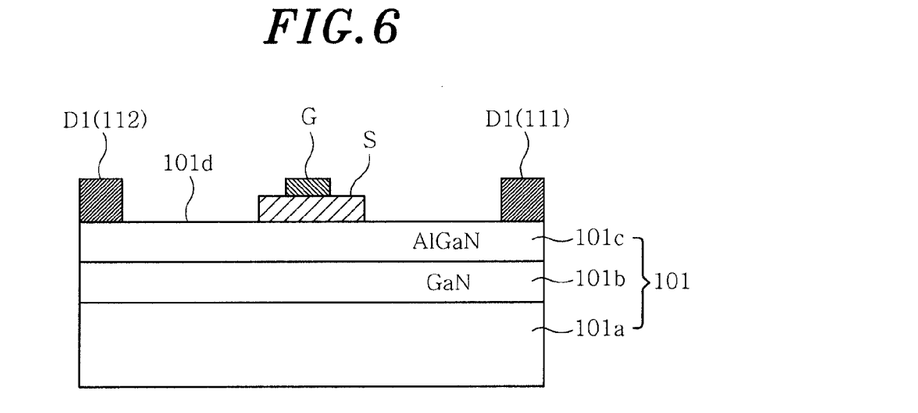
FIG. 6 is a cross-sectional view taken along line VI-VI shown in FIG. 4.

As a specific example of the bidirectional switch elements Q1 to Q8, a bidirectional switch element 100 having a lateral transistor structure using a GaN/AlGaN structure will be described in detail. FIG. 4 is a plan view showing a configuration of the bidirectional switch element 100. FIG. 5 is an enlarged view of area A shown in FIG. 4, and FIG. 6 is a cross-sectional view taken along line VI-VI shown in FIG. 4. Further, the bidirectional switch element 100 in which only one gate G is provided between two electrodes D1 and D2 is referred to as a single gate type.

As shown in FIG. 6, a substrate 101 of the bidirectional switch element 100 includes a conductive layer 101a and a GaN layer 101b and an AlGaN layer 101c which are formed on the conductive layer 101a. In this embodiment, a two-dimensional electron gas layer, which is generated at a hetero interface between AlGaN and GaN, is used as a channel layer. As shown in FIG. 4, a first electrode D1 and a second electrode D2 respectively connected in series with respect to the DC power source 11 or 12 and the winding N1 or N2, and an intermediate potential portion S having an intermediate potential relative to the potential of the first electrode D1 and the potential of the second electrode D2 are formed on a surface 101d of the substrate 101. Further, a control electrode (gate) G is formed on the intermediate potential portion S. For example, a Schottky electrode is used as the control electrode G.

The first electrode D1 has a comb shape having electrode portions 111, 112, 113 . . . arranged in parallel to one another, and the second electrode D2 has a comb shape having electrode portions 121, 122, 123 . . . arranged parallel to one another. The comb-shaped electrode portions of the first electrode D1 and the comb-shaped electrode portions of the second electrode D2 are arranged opposite to each other. Since the intermediate potential portion S and the control electrode G are respectively disposed between the comb-shaped electrode portions 111, 112, 113 . . . and 121, 122, 123 . . . , they have a shape (substantially fish spine shape) similar to the planar shape of the space defined between the electrode portions.

Next, a lateral transistor structure of the bidirectional switch element 100 will be described. As shown in FIG. 5, the electrode portion 111 of the first electrode D1 and the electrode portion 121 of the second electrode D2 are arranged such that center lines in the width direction thereof are aligned. In addition, the intermediate potential portion S and the control electrode G are positioned in parallel to the electrode portion 111 of the first electrode D1 and the electrode portion 121 of the second electrode D2. Distances in the width direction from the electrode portion 111 of the first electrode D1 and the electrode portion 121 of the second electrode D2 to the intermediate potential portion S and the control electrode G are set such that a predetermined withstand voltage can be maintained. Distances in the longitudinal direction of the electrode portion 111 of the first electrode D1 and the electrode portion 121 of the second electrode D2, i.e., perpendicular to the width direction are also set in the same manner.

In addition, such relationships are the same as those of the other electrode portions 112 and 122, and 113 and 123. That is, the intermediate potential portion S and the control electrode G are disposed at positions at which a predetermined withstand voltage can be maintained with respect to the first electrode D1 and the second electrode D2.

Therefore, assuming that the first electrode D1 is in a high potential side and the second electrode D2 is in a low potential side, when the bidirectional switch element 100 is turned off, the current is completely interrupted between at least the first electrode D1, and the control electrode G and the intermediate potential portion S (the current is blocked directly under the control electrode (gate) G).

On the other hand, when the bidirectional switch element 100 is turned on, i.e., when a signal having a voltage equal to or higher than a predetermined threshold is applied to the control electrode G, a current flows through a path of the first electrode D1 (electrode portion 111 . . . ), the intermediate potential portion S, and the second electrode D2 (electrode portion 121 . . . ) as indicated by the arrow in the figure, and vice versa.

As a result, even though a threshold voltage of the signal applied to the control electrode G is lowered to the required minimum level, it is possible to securely turn on/off the bidirectional switch element 100, thereby enabling a low on-resistance. Further, since the electrode portions 111 112, 113 . . . of the first electrode D1 and the electrode portions 121, 122, 123 . . . of the second electrode D2 can be arranged in a comb shape, a high current can be obtained without increasing a chip size of the bidirectional switch element 100.

Figure 7:
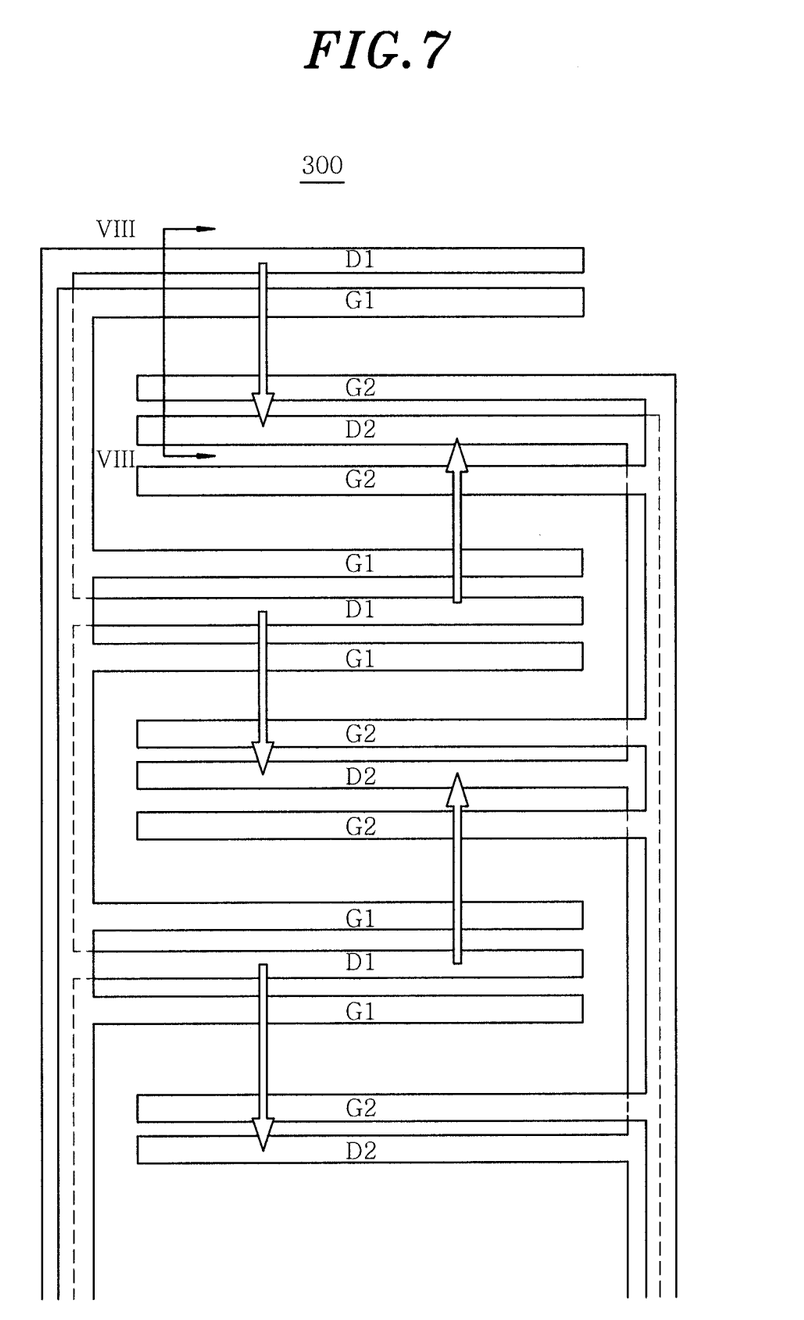
FIG. 7 is a plan view showing a configuration of the bidirectional switch element (dual gate)
Figure 8:
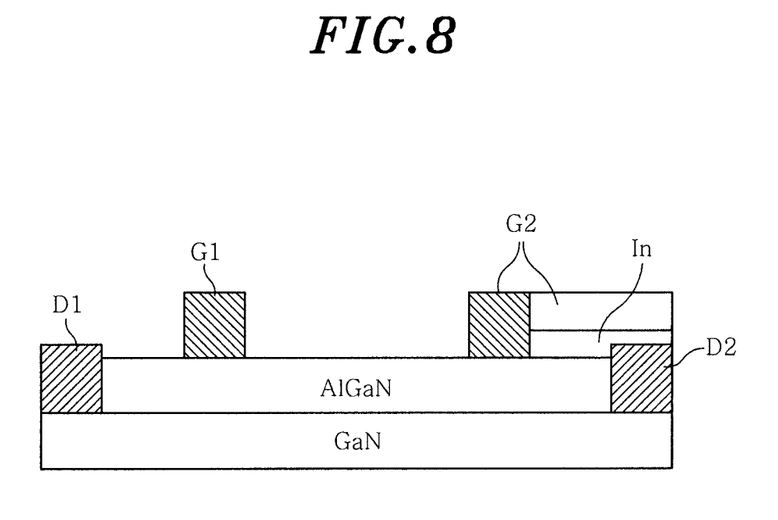
FIG. 8 is a cross-sectional view taken along line VIII-VIII shown in FIG. 7.

FIGS. 7 and 8 show a configuration of another bidirectional switch element 300 having a lateral transistor structure using a GaN/AlGaN structure. FIG. 7 is a plan view showing the configuration of the bidirectional switch element 300. FIG. 8 is a cross-sectional view taken along line VIII-VIII shown in FIG. 7. Further, the bidirectional switch element 300 is referred to as a dual gate type because two gates G1 and G2 are provided between two electrodes D1 and D2.

As shown in FIGS. 7 and 8, the bidirectional switch element 300 of the lateral dual transistor structure is configured to have a single portion for maintaining a withstand voltage, so that it is possible to implement a bidirectional switch element with a small loss. In other words, the drain electrodes D1 and D2 are formed on the GaN layer, and the gate electrodes G1 and G2 are formed on the AlGaN layer. In a state where no voltage is applied to the gate electrodes G1 and G2, an electron depletion region occurs in the two-dimensional electron gas layer generated at the AlGaN/GaN heterogeneous interface directly below the gate electrodes G1 and G2, and no current flows. On the other hand, when a voltage is applied to the gate electrodes G1 and G2, a current flows in the AlGaN/GaN heterogeneous interface from the drain electrode D1 toward the drain electrode D2 (or reversely).

To obtain a withstand voltage, a predetermined distance is required between the gate electrodes G1 and G2. However, no withstand voltage is required between the drain electrode D1 and the gate electrode G1 and between the drain electrode D2 and the gate electrode G2. Therefore, the first electrode D1 and the gate electrode G1, or the drain electrode D2 and the gate electrode G2 may be overlapped with each other via an insulating layer In interposed therebetween. Further, the element with such a configuration needs to be controlled based on the voltages of the drain electrodes D1 and D2, and therefore it is necessary to input a drive signal to the respective gate electrodes G1 and G2 (thus, referred to as a dual gate transistor structure).

Figure 9:
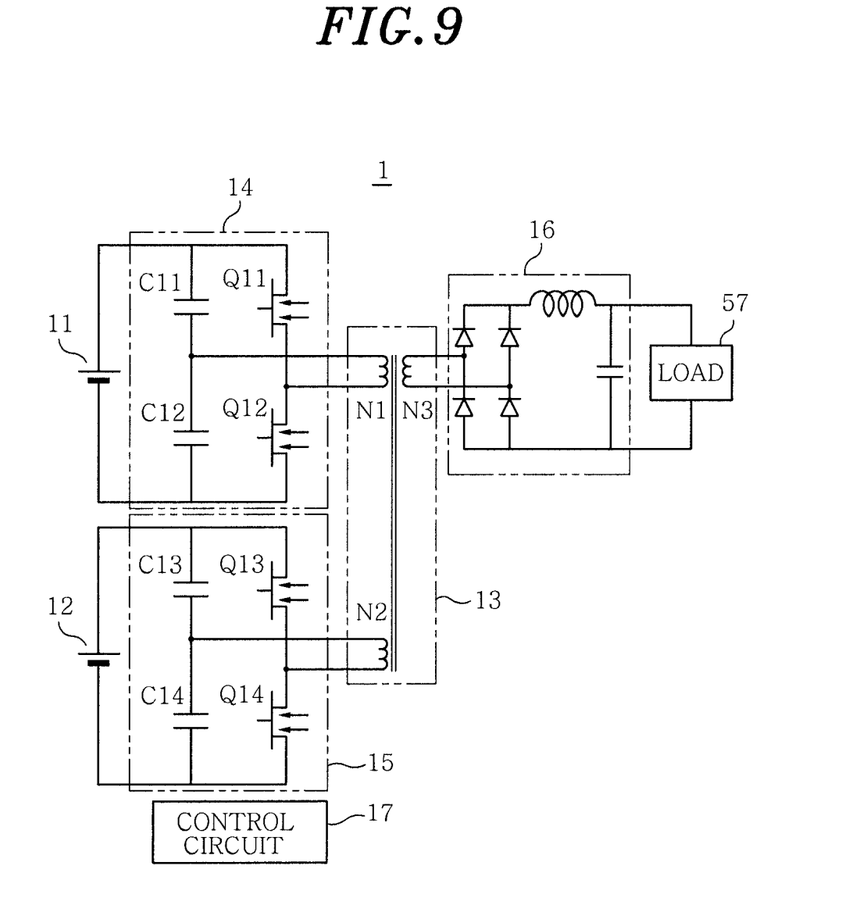
FIG. 9 shows another modification example of the DC/DC converter in accordance with the embodiment of the present invention.

FIG. 9 shows another modification example of the DC/DC converter 1. In this modification example, each of the first and the second oscillation circuit 14 and 15 has a half-bridge circuit. The first oscillation circuit 14 includes a pair of bidirectional switch elements Q11 and Q12 connected in series, and a series circuit of capacitors C11 and C12 connected in parallel to the series circuit of the bidirectional switch elements Q11 and Q12. The first primary winding N1 is connected between a midpoint of the series circuit of the bidirectional switch elements Q11 and Q12 and a midpoint of the series circuit of the capacitors C11 and C12.

Similarly, the second oscillation circuit 15 includes a pair of bidirectional switch elements Q13 and Q14 connected in series, and a series circuit of capacitors C13 and C14 connected in parallel to the series circuit of the bidirectional switch elements Q13 and Q14. The second primary winding N2 is connected between a midpoint of the series circuit of the bidirectional switch elements Q13 and Q14 and a midpoint of the series circuit of the capacitors C13 and C14.

When the bidirectional switch element Q11 is turned on and the bidirectional switch element Q12 is turned off, the current flows in the bidirectional switch element Q11 and the first primary winding N1 of the transformer 13 by the electric charges charged in the capacitor C11. Further, when the bidirectional switch element Q12 is turned on and the bidirectional switch element Q11 is turned off, the current flows in the opposite direction in the bidirectional switch element Q12 and the first primary winding N1 of the transformer 13 by the electric charges charged in the capacitor C12. This operation is repeated, and the current flows alternately in different directions in the first primary winding N1 of the transformer 13. The same applies to the second oscillation circuit 15.

In the case of this modification example, as compared with the case where each of the first and the second oscillation circuit 14 and 15 shown in FIG. 1 has a full-bridge circuit, the voltage applied to the first and the second primary winding N1 and N2 of the transformer 13 is ½ of the voltage of the first and the second DC power source 11 and 12. However, it has an advantage of simplifying the structure and facilitating the control of the first and the second oscillation circuit 14 and 15.

Figure 10:
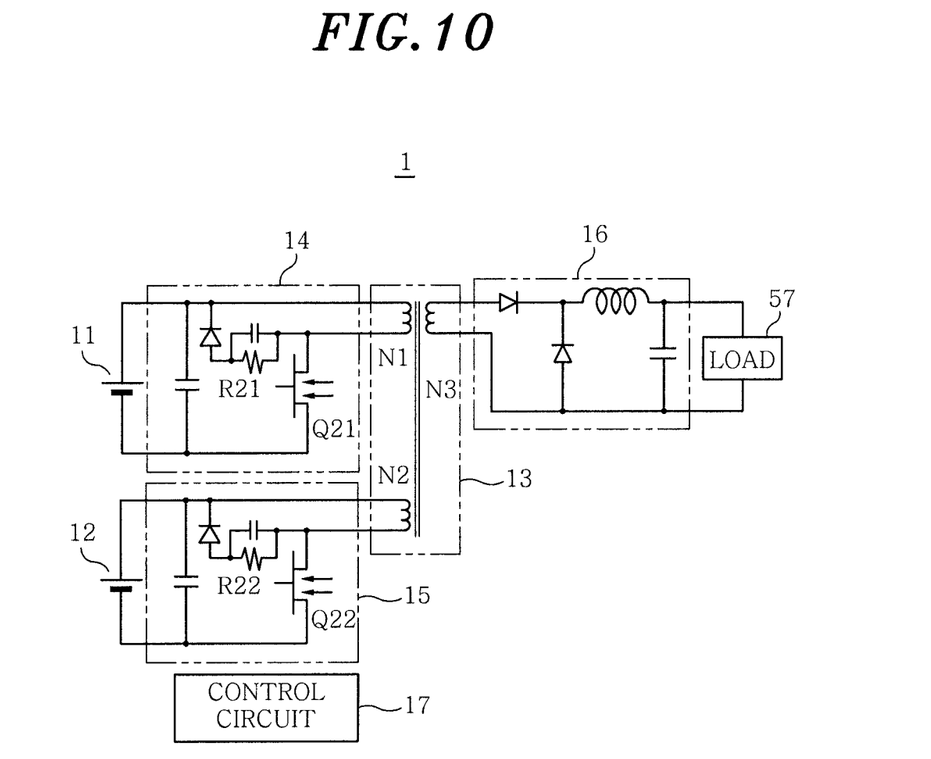
FIG. 10 shows still another modification example of the DC/DC converter in accordance with the embodiment of the present invention.

FIG. 10 shows still another modification example of the DC/DC converter 1. In this modification example, each of the first and the second oscillation circuit 14 and 15 is configured to include a forward converter having only one of bidirectional switch elements Q21 and Q22. Further, in the bidirectional switch elements Q21 and Q22, there are provided reset circuits R21 and R22 for preventing the magnetization of the core. The control circuit 17 controls the bidirectional switch element Q21 or Q22 so as to repeatedly turn on and off at a predetermined frequency. When the bidirectional switch element Q21 or Q22 is turned on, a current flows in the first primary winding N1 or the second primary winding N2 of the transformer 13, and an electromotive force is generated and a current flows in the secondary winding N3 of the transformer 13. Thus, by configuring the forward converter, it becomes possible to simplify the configuration of the first oscillation circuit 14, the second oscillation circuit 15 and the rectifier circuit 16.

Figure 11:
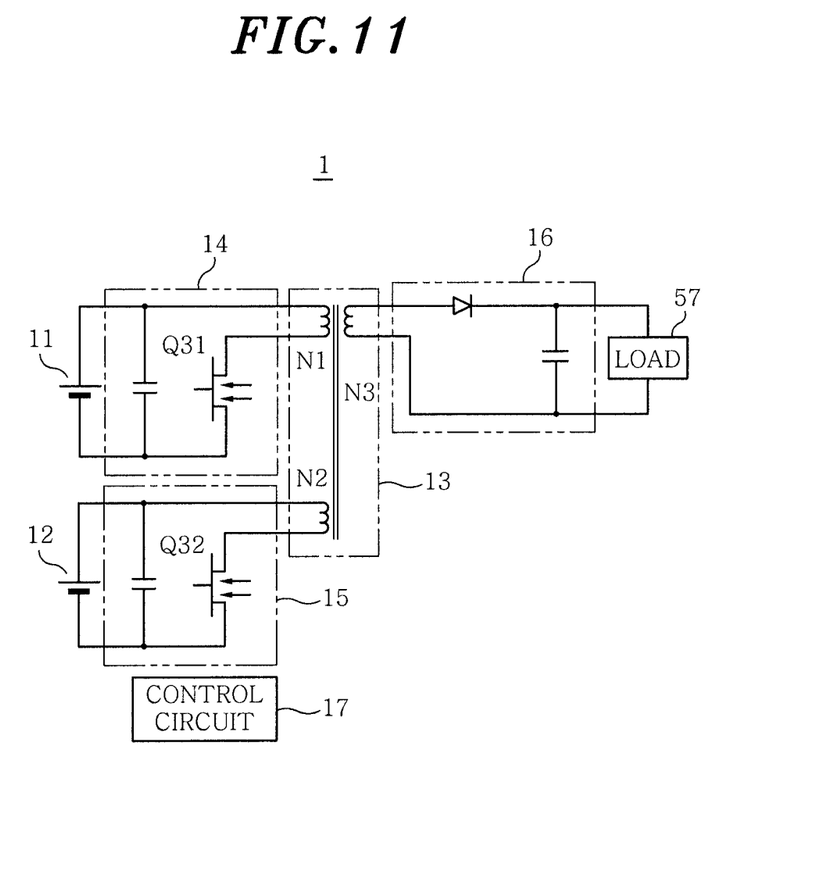
FIG. 11 shows still another modification example of the DC/DC converter in accordance with the embodiment of the present invention.

FIG. 11 shows still another modification example of the DC/DC converter 1. In this modification example, a flyback converter is configured by using a flyback transformer serving as the transformer 13.

Each of the first and the second oscillation circuit 14 and 15 uses only one of bidirectional switch elements Q31 and Q32. The control circuit 17 controls the bidirectional switch element Q31 or Q32 so as to repeatedly turn on and off at a predetermined frequency.

When the bidirectional switch element Q31 or Q32 is turned on, a current flows in the first primary winding N1 or the second primary winding N2 of the transformer 13 to magnetize the core of the transformer 13. Further, when the bidirectional switch element Q31 or Q32 is turned on, no current flows in the secondary winding N3 of the transformer 13.

On the other hand, when the bidirectional switch element Q31 or Q32 is turned off, a current flows in the secondary winding N3 of the transformer 13 so as to release the magnetic energy from the core. Thus, by configuring a flyback converter using a flyback transformer, it is possible to simplify the configuration of the first oscillation circuit 14, the second oscillation circuit 15 and the rectifier circuit 16. In the case of the flyback converter, as compared with the forward converter, the direction of the current flowing through the secondary winding N3 of the transformer 13 is reversed.

As described above, in accordance with the embodiments of the present invention, for a hybrid power source including a plurality of DC power sources such as a solar cell, a secondary battery as a backup power source of the solar cell and the like, it is possible to provide a DC/DC converter which shares a transformer and a rectifier circuit and includes a plurality of oscillation circuits with low loss.

Further, since bidirectional switch elements, each having no body diode, are used as switch elements included in the oscillation circuit, when supplying an electric power to the load from one DC power source while the bidirectional switches elements of the oscillation circuit connected to the other DC power source are turned off, no reverse current flows through the other DC power source. Therefore, the power supply efficiency of the DC power source (the one that supplies the electric power) is not reduced, and there occurs no loss due to the body diode.

Further, if necessary, when one DC power source is used as a secondary battery and the voltage of the other DC power source is set to be higher than the voltage of the secondary battery, it is possible to charge the secondary battery through the DC/DC converter.

Further, in addition to the solar cell and the secondary battery, other DC power sources such as a fuel cell and the like may be used as a DC power source. Further, in the description of the above embodiments, a bidirectional switch element having no body diode has been illustrated as an example of a switch element included in the DC/DC converter, but any element can be used as long as it has no body diode. For example, two unidirectional switches may be used in combination.

While the invention has been shown and described with respect to the embodiments, it will be understood by those skilled in the art that various changes and modification may be made without departing from the scope of the invention as defined in the following claims.

What is claimed is:
1. A converter circuit comprising:
a transformer having a first primary winding, a second primary winding and a secondary winding;
a rectifier circuit connected between the secondary winding and a load;
a first oscillation circuit connected to a first DC power source and the first primary winding;
a second oscillation circuit connected to a second DC power source and the second primary winding; and
a control circuit configured to control the first and the second oscillation circuits,
wherein each of the first and the second oscillation circuits includes at least one switch element having no body diode,
wherein at least one of the first and the second primary windings have a number of turns which are variable, and
wherein the first and the second primary windings are configured such that a ratio n2/n1 is allowed to be selectively switched between n2/n1=Vref2/Vref1 and n2/n1>Vref2/Vref1,
where n1 and n2 are numbers of turns of the first and the second primary windings, respectively; and Vref1 and Vref2 are reference voltages of the first and the second DC power sources, respectively.
2. The converter circuit of claim 1, wherein each of the first and the second oscillation circuits comprises two pairs of switch elements each having no body diode, the two pairs of the switch elements forming a full-bridge circuit.

3. The converter circuit of claim 1, wherein each of the first and the second oscillation circuits comprises a pair of switch elements each having no body diode, the pair of switch elements forming a half-bridge circuit.

4. The converter circuit of claim 1, wherein each of the first and the second oscillation circuits comprises a single switch element having no body diode.

5. The converter circuit of claim 1, wherein each of the at least one switch elements having no body diode of each of the first and the second oscillation circuits has a lateral transistor structure comprising a GaN layer and an AlGaN layer.

6. The converter circuit of claim 5, wherein each of the at least one switch element having no body diode of each of the first and the second oscillation circuits is a single gate transistor.

7. The converter circuit of claim 1, wherein each of the at least one switch elements having no body diode of each of the first and the oscillation circuits is a bidirectional switch element.

8. The converter circuit of claim 1, wherein the transformer is a flyback transformer.

9. The converter circuit of claim 1, wherein a reverse current does not flow through each of the first and the second oscillation circuits when the at least one switch element in the corresponding oscillation circuit is turned off.

* * * * *